United States Patent
Richards et al.

(10) Patent No.: US 7,552,064 B2
(45) Date of Patent: Jun. 23, 2009

(54) METHOD FOR RETRIEVING SHIPPING PLATFORMS

(75) Inventors: Benjamin Richards, Ithaca, NY (US); Jason Brennan, Ithaca, NY (US)

(73) Assignee: Onqweoweh Corp., Ithaca, NY (US)

( * ) Notice: Subject to any disclaimer, the term of this patent is extended or adjusted under 35 U.S.C. 154(b) by 1494 days.

(21) Appl. No.: 10/021,375

(22) Filed: Oct. 30, 2001

(65) Prior Publication Data

US 2003/0083920 A1 May 1, 2003

(51) Int. Cl.
*G06B 19/419* (2006.01)
(52) U.S. Cl. ................................. 705/8; 705/1; 705/26
(58) Field of Classification Search .................... 705/8, 705/1, 26
See application file for complete search history.

(56) References Cited

U.S. PATENT DOCUMENTS

| | | | | |
|---|---|---|---|---|
| 5,829,229 | A | | 11/1998 | Hyatt et al. ..................... 53/445 |
| 5,953,234 | A | * | 9/1999 | Singer et al. ................. 700/214 |
| 5,971,592 | A | | 10/1999 | Kralj et al. ................... 700/225 |
| 6,044,363 | A | * | 3/2000 | Mori et al. ..................... 705/37 |
| 6,058,586 | A | | 5/2000 | Bowling et al. .......... 29/402.11 |
| 6,108,639 | A | * | 8/2000 | Walker et al. ................. 705/26 |
| 6,148,291 | A | * | 11/2000 | Radican ........................ 705/28 |
| 6,658,390 | B1 | * | 12/2003 | Walker et al. .................. 705/5 |
| 6,915,274 | B2 | * | 7/2005 | Abhyanker .................... 705/26 |
| 2002/0019785 | A1 | * | 2/2002 | Whitman ...................... 705/28 |
| 2002/0029187 | A1 | * | 3/2002 | Meehan et al. ................ 705/37 |
| 2002/0069141 | A1 | * | 6/2002 | Kawamura et al. ............ 705/28 |
| 2002/0082974 | A1 | * | 6/2002 | Berstis ........................ 705/37 |

OTHER PUBLICATIONS

"Materials Handling.com", Warehousing Management, Jul. 2001 [retrieved Nov. 10, 2005], vol. 8, No. 6, pp. 1-10, retrieved from: Dialog, file 15.*
LeBlanc, Rick, "Outlook for Third Party Management: Growth and Change", www.palletenterprise.com, Mar. 1, 1999 [retrieved Nov. 9, 2005], pp. 1-9, retrieved from: Google.com.*
PalletNet, www.palletnet.com, Aug. 8, 2001 [retrieved Nov. 9, 2005], pp. 1-16, retrieved from: Google.com and Archive.org.*
TradeOut, www.Tradeout.com, Aug. 28, 2000 [retrieved Nov. 10, 2005], pp. 1-14, retrieved from: Archive.org and Google.com.*
"PalletOnline Revolutionizes Shipping and Logistics", PR Newswire, Oct. 17, 2000 [retrieved Nov. 9, 2005], pp. 1-4, retrieved from: Dialog, file 613.*
PalletOnline, www.palletonline.com, Feb. 16, 2001 [retrieved Nov. 9, 2005], pp. 1-12, retrieved from: Google.com and archive.org.*

(Continued)

*Primary Examiner*—Beth V Boswell
(74) *Attorney, Agent, or Firm*—Brown & Michaels, PC

(57) ABSTRACT

A business method that uses a coordinator to insure that a shipper is able to retrieve shipping platforms from a recycler or other such end receivers. A permanent identification representing the recycling and reuse program and the particular type of shipping platform is assigned, and is stenciled on shipping platforms. When the shipping platforms are used and reach an end recipient or recycler, the quantity and type of shipping platform are registered at the web site. The site is accessible for buyers, such as the shipper that entered into the program to retrieve shipping platforms they had used. Transactions are carried out through the coordinator.

5 Claims, 3 Drawing Sheets

OTHER PUBLICATIONS

Ongweoweh, www.ongweoweh.com, May 26, 2000 [retrieved Nov. 9, 2005], pp. 1-11, retrieved from: Google.com and archive.org.*

"Track Those Pallets", Modern Materials Handling, Mar. 31, 2000 [retrieved Nov. 9, 2005], vol. 55, No. 3, 1 page, retrieved from: Dialog, file 16.*

Healy, John, "Extraordinary Times for Pallet Distributors", Industrial Distribution, Feb. 1999 [retrieved Nov. 9, 2005], pp. 1-4, retrieved from: Dialog, file 148.*

Canadian Pallet Council (CPC), www.cpcpallet.com, Mar. 1, 2000 [retrieved Nov. 10, 2005], pp. 1-30, retrieved from: Google.com and archive.org.*

"Tradeout Sells Assets Online", Business Wire, Jun. 21, 2000 [retrieved 11/105], pp. 1-2, retrieved from: Dialog, file 16.*

SJF Material Handling, Inc., www.sjf.com, Feb. 20, 1999 [retrieved Nov. 10, 2005], pp. 1-14, retrieved from: Google.com and archive.org.*

Chep.com, www.chep.com, Jun. 20, 2001, pp. 1-21, retrieved from: Google.com and archive.org.*

Kroon, Leo, et al., "Returnable Containers: an example of reverse logistics", International Journal of Physical Distribution and Logistics Management, 1995 [retrieved Aug. 19, 2007], vol. 25, Iss. 2, 9 pages, retrieved from: Proquest Direct.*

Andel, Tom, "It's a Two-way Stream", Integrated Warehousing & Distribution, Dec. 1996, pp. 81-91.*

"The Container Case", Economist, Oct. 21, 2000 [retrieved Aug. 14, 2007], vol. 357, Iss. 8193, pp. 1-3, retrieved from: EBSCOhost.*

Saphire, David, "Delivering the Goods: Benefits of Reusable Shipping Containers", Inform, 1994, pp. 1-24, retrieved from: Google Scholar.*

Small, Stefanie, "Distribution Dispatches", Warehouse Management, Oct. 1998 [retrieved Mar. 23, 2009], vol. 5, No. 10, 5 pages, retrieved from: Dialog, file 15.*

"PalletOnline Revolutionizes shipping and logistics", Canada Newswire, Oct. 2000 [retrieved Mar. 27, 2009], 2 pages, retrieved from: Proquest.*

"Instil's auction Solution", M2 Presswire, Sep. 18, 2000 [retrieve Mar. 27, 2009], 2 pages, retrieved from: Proquest.*

American Society for Testing and Materials. "Practice D6253-98 Standard for Marking of Pallets." Document summary, 200. http://www.devicelink.com/pmpn/archive/99/03/010.html.

NWPCA. "Pallet Design and Quality" http://www.nwpca.com/pallet_design.htm 2000.

"Computer Industry Pallet Specification Draft Update Jun. 15, 2000" http://packaging.hp.com/EIPS/Knowledge/pallet_specification_61500.htm. 2000.

* cited by examiner

Fig. 4

METHOD FOR RETRIEVING SHIPPING PLATFORMS

BACKGROUND OF THE INVENTION

1. Field of the Invention

The invention pertains to the field of methods of recycling and reuse of shipping platforms, including retrieving and returning shipping platforms from downstream receivers. More particularly, the invention pertains to identifying shipping platforms and using a computer network to identify, to retrieve, recycle, and/or return the shipping platforms back to the original shipper.

2. Description of Related Art

Industries all over the world ship their goods using shipping platforms. Industries customize shipping platform specifications for the shipping of their product. Shipping platforms can be made out of a variety of materials, such as wood, plastic, and aluminum. Once the industries have shipped their product using the shipping platforms, the receiver then has to deal with all of the shipping platforms that are left. The receiver might not have the knowledge of where each shipping platform has come from or whether it is reusable. This poses a problem for the receiver in terms of discarding the shipping platforms.

The receiver most often cannot grind the shipping platforms, which often led to the only alternative of placing them in a landfill. Some recycling companies or scrap dealers will accept shipping platforms from end recipients, but then they must determine where the shipping platforms should be sent or sold, or they will have to dispose of them.

Since there began to be a possibility of introducing harmful chemicals into the land from the shipping platforms, it has been an objective of the industries using shipping platforms to try and reuse them. In the process of meeting this objective there have been several patents issued in recent years. For example, Hyatt's "Recyclable Packaging System and Process for Using the Same," U.S. Pat. No. 5,829,229, issued on Nov. 3, 1998, shows a system where a "resource manager" keeps an inventory of the trays used for the assembly of a product. The trays that end up at the product manufacturer and at the purchaser as being in excess are returned to the Resource Manager through a reuse program and an 800 number. The Resource Manager cleans, repairs, and recycles the trays, which are then put back into the closed loop system.

Another example is Kralj's "Integrated Reusable Pallet Having Data Collection Devices and Method for Using Shipping Conveyances," U.S. Pat. No. 5,971,592, issued on Oct. 26, 1999, shows a method of recycling shipping platforms that includes a built in computer chip (EPROM) to store the pallet information. When a pallet is received, it is assigned a permanent ID number by the computer at the Main Pallet Placement Office, which also tracks the location and use of the pallet. If the customer has no further use for the shipping platforms, the pallet provider is called to pick up the shipping platforms. The shipping platforms are taken back to a Receiver Pallet Placement Office which reads the electronic device and reports back to the Main Pallet Placement Office, who then bills the customers for use of the shipping platforms.

Bowling's "Method and Apparatus for Repairing Pallets," U.S. Pat. No. 6,058,586, issued on May 9, 2000 deals mostly with the repairing of the pallets, in the process of repairing the pallets, an identifying indicia is placed on the pallet by the shipper repairing the pallet. The indicia only gives information regarding the repair shipper of the pallets.

The American Society for Testing and Materials (ASTM) has a standard practice for marking of pallets, practice D6253-98. This standard is voluntary and involves marking each pallet with a minimum of: name of pallet manufacturer, repair shipper, or owner identification code; industry or government specification that was followed to produce the pallet; month and year the pallet was produced; and whether the pallet will have multiuse (M), limited use (L), or repair (R). This standard is voluntary and does not provide a means of return. Plus, the codes that are used are not standard throughout the entire industry, making it difficult for everyone to use them.

The computer industry has also established specifications for pallets used in their industry, including marking pallets with a material classification mark, supplier designation, country of manufacture of the pallet, date of manufacture of the pallet, the part number, the engineering change number, and the reusable pool system symbol. This shows that the industry is coming to realize that need to identify shipping platforms. This mark does not specify where the pallets need to go after they have been used, furthermore, these markings do not pertain to a shipper using the mark or stencil for recycling purposes.

Other such marks that specify a certain pallet have been used since the end of World War II in Europe, such as EUR. This stamp only identifies that it is the specific pallet made in Europe and does not identify an original shipper or provide a means of return. Other marks such as CP1-9, CHEP, and PECO which only say "property of" also identify specific pallets but do not provide a means of returning the pallets.

SUMMARY OF THE INVENTION

The invention is a method for identifying, retrieving, and returning shipping platforms from downstream receivers through the use of an identification stenciling shipper entering into the program with a coordinator to retrieve shipping platforms. The coordinator assigns an identification to the type of platform and creates a page within their web site with the shipping platform's numbers and other information regarding the shipper, as well as the construction, and repair of the shipping platforms. The identification is stenciled on all shipping platforms in the program, and includes a logo or other indication that the identification belongs to the program.

The end receivers of the shipping platforms (which might be recipients of the goods, or recyclers or scrap dealers) register the type, quantity, and permanent number found on the shipping platforms at the program's web site. The coordinator may inform the end receiver of the proper repair specifications (if applicable) for the particular type of shipping platforms, based on the information on the web page for that type of platform.

The shipper or other buyers can search the web site for certain types of shipping platforms. When more information is needed regarding the shipping platforms, the coordinator contacts the end receiver to retrieve the information for the shipper or buyer. If the buyer or shipper wishes to proceed with a sale, an amount is agreed upon and paid to the coordinator. The coordinator then pays the end receiver for the platforms, for example, a percentage of the sales amount.

BRIEF DESCRIPTION OF THE DRAWING

FIG. 4 shows an example of a web page where the end recipients register the number of program platforms they have.

DETAILED DESCRIPTION OF THE INVENTION

The method of the invention allows companies to retrieve shipping platforms that were used from down stream receivers, saving money on having to produce new shipping platforms with certain specifications to ship their product, and saves the shipper money on the cost of buying shipping platforms. At the same time the method decreases the amount of shipping platforms going to the landfill, increases the amount of revenue to recyclers, and decreases landfill expenses.

Figure 1:
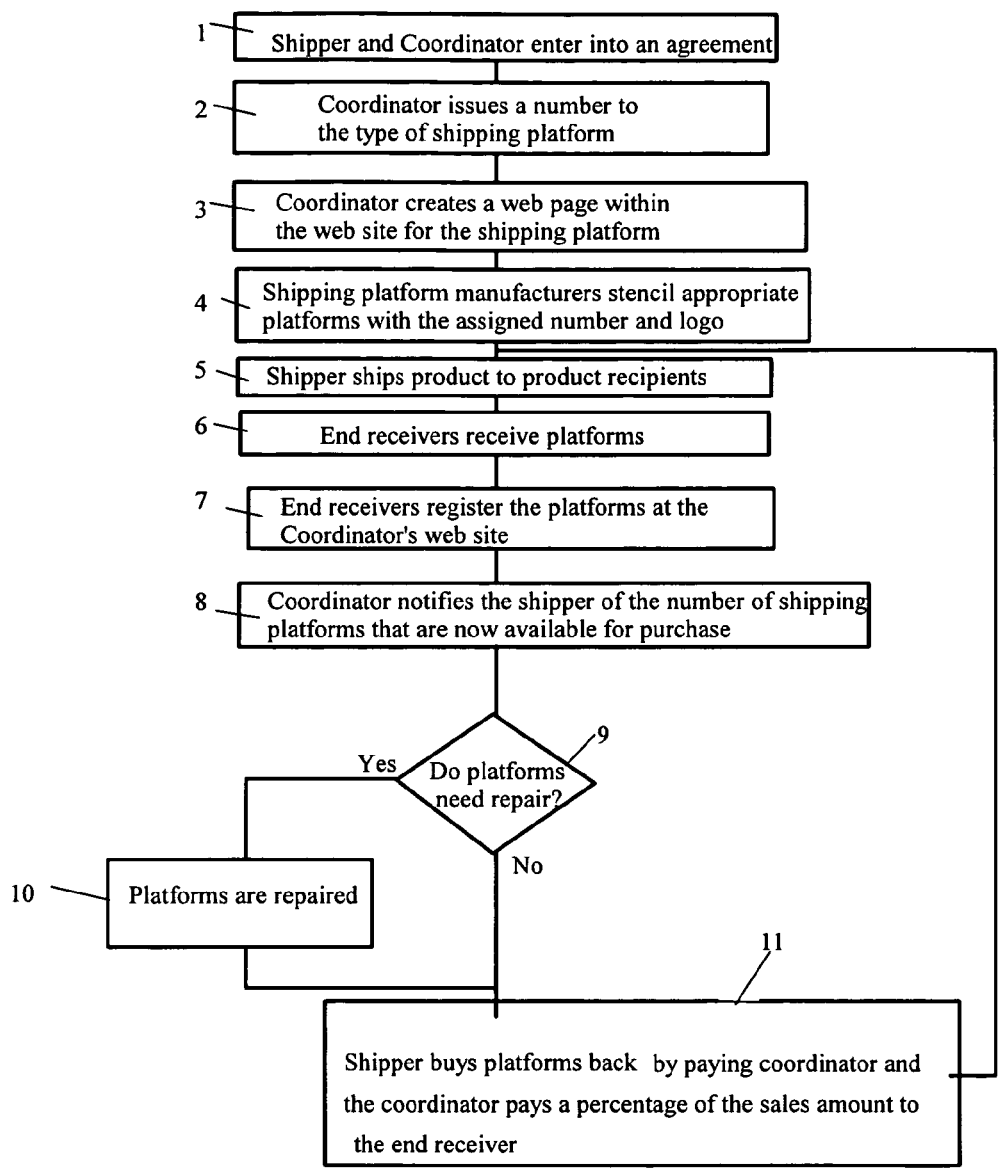
FIG. 1 shows a flow diagram, which describes the method of the present invention.

FIG. 1 shows a flowchart outlining the steps in the method to accomplish the goal of retrieving a shipper's shipping platforms.

(1) The process starts by the shipper entering into the program to retrieve shipping platforms.

(2) A permanent number or other identification is issued which corresponds to the particular shipping platforms that the shipper is interested in retrieving. A separate identifier is assigned for every platform having a distinct specification, specified by that shipper. The numbers are preferably not assigned to used shipping platforms or shipping platforms manufactured with reclaimed lumber.

(3) The coordinator creates a separate page within its web site that has information specific to the shipping platform and the shipper.

(4) The coordinator sends the platform manufacturer or shipper a stencil design, including the identification and material indicating membership in the program, for putting on shipping platforms.

(5) The shipper then uses the stenciled shipping platforms to ship their products to direct recipients. The "direct recipients" are those parties who receive the shipping platforms in the course of their life as product-handling items, such as transporters, warehousers, wholesalers, brokers, retail stores or other distributors of the shipper's products. Because at this point the movement of goods, rather than the shipping platforms, is the driving force, the shipping platforms may pass through many hands with the products upon them, before they will once again become the subject of the method of the invention.

(6) After the direct recipients are finished using the shipping platforms, they will progress eventually to an "end recipient"—a recycler, a scrap dealer, or perhaps even the direct recipient itself, depending on the particulars of the industry and the parties. The "end recipient" is the one who winds up with the shipping platforms once their use as product-handling items is over. At this point, it is the disposition of the shipping platforms (rather than the goods upon them) which is of interest, and the shipping platform is the focus of the method of the invention once again.

(7) The end recipient, seeing the stencil on the shipping platforms, which indicate they are registered in the program, then lists the shipping platforms on the website using a remote computer that accesses the web site.

(8) The coordinator informs the shipper of the number of available shipping platforms.

(9) The shipping platforms are checked to see if they are repairable, based on the specifications that are laid out by the shipper in the web page.

(10) If the shipping platforms do need to be repaired, they are repaired (preferably, sent to a repair facility, although the repairs could be done by the recycler/end recipient). The specifications regarding the repairs are provided as they were set by the shipper on the web page. The repair facility repairs the shipping platforms.

(11) The end recipient then returns or sells the platforms to shippers or third party companies using the web site. When a shipper buys back the shipping platforms, the shipper uses them to ship out products once again (returning to step 5).

The sale and transfer of the platform could be done by the steps of the shipper asking for more information regarding the shipping platforms listed on the web site; the coordinator notifying the end recipient of the need for more information; the end recipient supplying additional information to the coordinator; the coordinator giving the needed information to the shipper; the shipper paying the coordinator the amount agreed upon for the shipping platforms; and the coordinator paying the end receiver a percentage of the sale amount.

Figure 2:
FIG. 2 shows an example of the stencil provided to the shipper by the coordinator with the assigned number and program logo.

FIG. 2 shows a stencil (20), which the coordinator might assign to a shipper. The stencil has the toll free number of the coordinator (21) along with the web site (22) address. The stencil also has a program prefix (24) (here, "GP") plus the specific identification (here, a number) (23) that was assigned to the shipper's particular shipping platform.

Figure 3:
FIG. 3 shows an example of the web page created within the web site for a shipping platform.

FIG. 3 shows an example of the web page (30) in the coordinator web site for a shipper's shipping platforms. The page might include a shipper profile (31), and will preferably include an image of the shipping platform (32), details of repair for the shipping platform (33) (perhaps including specifications for making new shipping platforms of this kind, the type of lumber that can be used when making repairs, nails or hardware to be used, standards for excessive wear or contamination requiring retirement from the pool, and so on) and possibly other facts such as the annual usage number for the shipper or the like, or international acceptance of the platform. This screen also preferably has a tab or other link (34) which allows an end recipient, having received a quantity of shipping platforms with the logo (20), and having gone to the website (22), and found the shipping platform type screen (30), to "list shipping platforms" for sale.

Figure 4:
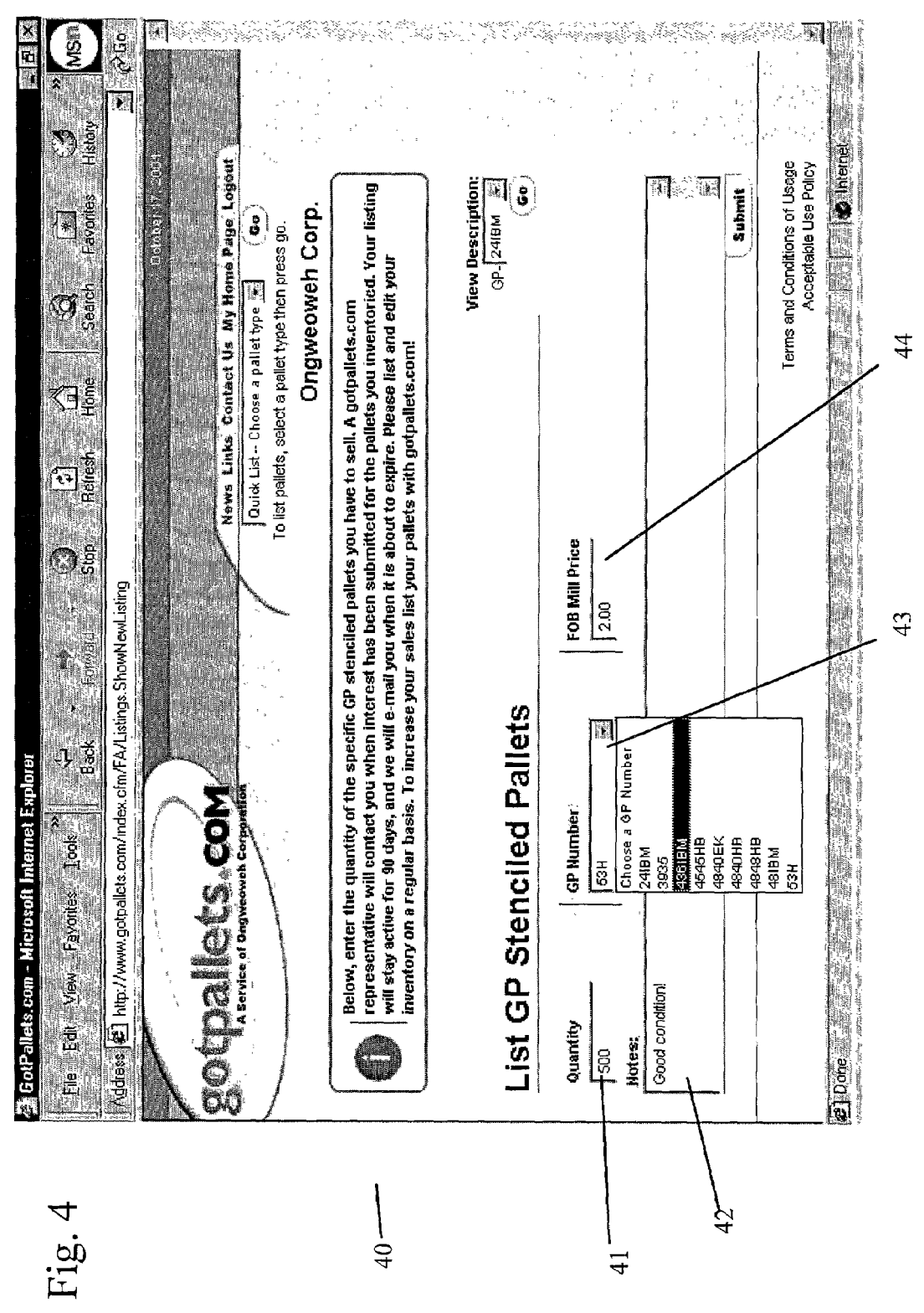

FIG. 4 shows an example of a web page (40), which might be used by end recipients to list the shipping platforms they have available for sale. The page might include the quantity (41) of the shipping platforms the end receiver has for sale, a pull down list (43) of the specific numbers (23) that were assigned to a shipper's particular shipping platforms. The page might also include a place for notes (42) regarding the shipping platforms the end receiver is putting up for sale and a place to enter the price (44) the end receiver is charging for the shipping platforms.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for retrieving specifically identified shipping platforms, through a coordinator, which have been sent by a plurality of original independent shippers along with the products of the original independent shippers to a plurality of end recipients for repurchase and reuse by the original shipper, comprising the steps of:

a) the coordinator issuing a separate identifier for shipping platforms of each original independent shipper and the original independent shipper marking the shipping platforms with the separate identifier showing an address for a coordinator managed computer website, wherein, by marking the shipping platforms, the shipping platforms become specifically identified shipping platforms;

b) the coordinator creating a remotely accessible listing on the coordinator managed computer website describing each of the specifically identified shipping platforms on the computer website, in which each of the specifically identified shipping platforms is associated with its original independent shipper;

c) the coordinator accepting a listing from an end recipient of at least one of the specifically identified shipping platforms identified in step (a) for sale by the end recipient to the original independent shipper at the computer website;

d) the coordinator notifying the original independent shipper associated in step (b) of the at least one of the specifically identified shipping platform listed by the end recipient in step (c), wherein the original independent shipper, in response to the notification, asks for more information regarding the at least one of the shipping platforms listed on the coordinator's computer website site, the coordinator notifying the end recipient for more information, the end recipient supplying the information to the original independent shipper, the coordinator settling upon an agreed upon sales amount for the at least one of the specifically identified shipping platforms;

e) the coordinator coordinating the sale and shipment of the at least one of the specifically identified shipping platforms from the end recipient to the original independent shipper; and (f) the end recipient selling the at least one of the specifically identified shipping platforms to the coordinator using the website;

wherein the original independent shipper pays the coordinator the a sales amount for repurchase of the at least one of the specifically identified shipping platforms which were transferred with the sale of the original independent shipper's products to the end recipient, and the coordinator pays the end recipient a percentage of the sales amount.

2. The method of claim 1, in which the file created in step (b) comprises information on repair standards for the specifically identified shipping platforms.

3. The method of claim 2, further comprising the step of repairing the specifically identified shipping platforms in accordance with the repair standards in the file.

4. The method of claim 2, in which the repair standards comprise at least one item selected from a list comprising: a description of repair policy; general guidelines; stringer board repairs; excessive wear and tear and contamination; nails and hardware; and lumber that can be used to repair the shipping platforms.

5. The method of claim 1, wherein the file created in step (b) comprises at least one item selected from a list comprising: the identifier issued to the specifically identified shipping platform; the original shipper profile; an image of the specifically identified shipping platform; repair specifications for the specifically identified shipping platform designated by the original shipper; shipping platform specifications; and the annual usage of the specifically identified shipping platform.

* * * * *

UNITED STATES PATENT AND TRADEMARK OFFICE
CERTIFICATE OF CORRECTION

PATENT NO. : 7,552,064 B2
APPLICATION NO. : 10/021375
DATED : July 1, 2009
INVENTOR(S) : Benjamin Richards and Jason Brennan It is certified that error appears in the above-identified patent and that said Letters Patent is hereby corrected as shown below:

<u>Title page, item [73] Assignee:</u>

Replace "Onqweoweh" with "Ongweoweh"

<u>Column 5:</u>

Line 18: replace "platform" with "platforms"

<u>Column 6:</u>

Line 5: omit "a"

Line 25: replace "identifier" with "identification"

Signed and Sealed this

Fourth Day of August, 2009

JOHN DOLL
*Acting Director of the United States Patent and Trademark Office*